US009664266B2

United States Patent
Hauvespre et al.

(10) Patent No.: US 9,664,266 B2
(45) Date of Patent: May 30, 2017

(54) CAM FOLLOWER ROLLER DEVICE

(71) Applicant: Aktiebolaget SKF, Göteborg (SE)

(72) Inventors: Benoît Hauvespre, Mettray (FR); Nijs van der Mei, Utrecht (FR)

(73) Assignee: AKTIEBOLAGET SKF, Gothenburg (SE)

( * ) Notice: Subject to any disclaimer, the term of this patent is extended or adjusted under 35 U.S.C. 154(b) by 90 days.

(21) Appl. No.: 14/093,396

(22) Filed: Nov. 29, 2013

(65) Prior Publication Data

US 2014/0150602 A1 Jun. 5, 2014

(30) Foreign Application Priority Data

Nov. 29, 2012 (FR) ...................................... 12 03229

(51) Int. Cl.
*F16H 25/14* (2006.01)
*F01L 1/14* (2006.01)
(Continued)

(52) U.S. Cl.
CPC ............... *F16H 25/14* (2013.01); *F01L 1/14* (2013.01); *F04B 1/0426* (2013.01); *F04B 1/0439* (2013.01); *F01L 2101/00* (2013.01); *F01L 2103/00* (2013.01); *F01L 2105/00* (2013.01); *F01L 2105/02* (2013.01); *F01L 2107/00* (2013.01); *F02M 59/102* (2013.01); *Y10T 29/49547* (2015.01); *Y10T 74/2107* (2015.01)

(58) Field of Classification Search
CPC ... F01L 13/00; F01L 2013/0052; F01L 1/047; F01L 1/14; F16H 25/08; F16H 25/14; F04B 1/0426; F02M 59/102

USPC ....... 74/569; 123/90.39, 90.48, 90.5; 92/129
See application file for complete search history.

(56) References Cited

U.S. PATENT DOCUMENTS 3,267,919 A * 8/1966 Wortman .................. F01L 1/14
123/188.11
3,795,229 A * 3/1974 Weber ....................... F01L 1/14
123/90.5
(Continued)

FOREIGN PATENT DOCUMENTS

DE 102010022318 A1 12/2011
FR 2946406 A1 12/2010
(Continued)

OTHER PUBLICATIONS

Stamping (metalworking), en.wikipedia.org., Nov. 25, 2015.*
English Abstract of KR 20110124159 A, Kucht et al., Nov. 2011.*
Define cylindrical—Google Search, google.com., Sep. 30, 2016.*

*Primary Examiner* — Vinh Luong
(74) *Attorney, Agent, or Firm* — Bryan Peckjian; SKF USA Inc. Patent Dept.

(57) ABSTRACT

A cam follower roller device, in particular for a fuel injection pump of an internal combustion engine, includes a tappet with a sleeve having an opening for partially accommodating a roller, a roller mounted rotatably in the sleeve and having a portion which protrudes axially from the opening of the sleeve provided to cooperate with a cam, and a roller support body housed in the sleeve. The roller includes a cylindrical spindle and a cylindrical body, the ends of the spindle projecting from the lateral faces of the body. The support body includes supports open towards the opening of the sleeve and supporting the ends of the spindle.

9 Claims, 4 Drawing Sheets

(51) Int. Cl.
*F04B 1/04* (2006.01)
*F02M 59/10* (2006.01)

(56) References Cited

U.S. PATENT DOCUMENTS

| | | | | |
|---|---|---|---|---|
| 4,335,685 A * | 6/1982 | Clouse | ........................ | 123/90.5 |
| 5,188,067 A * | 2/1993 | Fontichiaro | ............... | F01L 1/14 |
| | | | | 123/90.18 |
| 5,566,652 A | 10/1996 | Deppe | | |
| 5,673,657 A * | 10/1997 | Cecur | ..................... | F01L 1/143 |
| | | | | 123/90.5 |
| 5,676,098 A * | 10/1997 | Cecur | ..................... | F01L 1/143 |
| | | | | 123/90.33 |
| 6,688,269 B1 * | 2/2004 | Steinmetz | .................. | 123/90.48 |
| 7,484,488 B2 * | 2/2009 | Cecur | ..................... | F01L 1/143 |
| | | | | 123/90.48 |
| 7,793,583 B2 * | 9/2010 | Radinger et al. | ............... | 92/129 |
| 7,845,326 B2 * | 12/2010 | Oh | ........................... | F01L 1/143 |
| | | | | 123/90.16 |
| 2002/0073947 A1 * | 6/2002 | Battlogg | ................. | F01L 1/024 |
| | | | | 123/90.16 |
| 2005/0000314 A1 * | 1/2005 | Mandal et al. | ................. | 74/569 |
| 2010/0012065 A1 * | 1/2010 | Dorn | ....................... | F01L 1/143 |
| | | | | 123/90.48 |
| 2010/0294219 A1 * | 11/2010 | Prokop | .................... | F01L 1/14 |
| | | | | 123/90.5 |
| 2011/0265752 A1 * | 11/2011 | Dorn | ......................... | F01L 1/14 |
| | | | | 123/90.48 |
| 2012/0125277 A1 * | 5/2012 | Chambonneau et al. | . | 123/90.48 |
| 2012/0234277 A1 * | 9/2012 | Dorn | ....................... | F01L 1/146 |
| | | | | 123/90.48 |
| 2013/0068064 A1 * | 3/2013 | Geyer et al. | ..................... | 74/569 |
| 2013/0213181 A1 * | 8/2013 | Dorn | .................... | F02M 59/102 |
| | | | | 74/569 |
| 2015/0082938 A1 * | 3/2015 | Schick | ..................... | F01L 1/14 |
| | | | | 74/569 |
| 2015/0096515 A1 * | 4/2015 | Berruet | .................. | F02M 37/06 |
| | | | | 123/90.48 |
| 2015/0143947 A1 * | 5/2015 | Ghilbert-Simon | ...... | F16H 53/06 |
| | | | | 74/569 |
| 2015/0176691 A1 * | 6/2015 | Champalou | ............. | F16C 13/02 |
| | | | | 74/569 |
| 2016/0138541 A1 * | 5/2016 | Hauvespre | ................ | F01L 1/18 |
| | | | | 123/90.44 |
| 2016/0153321 A1 * | 6/2016 | Berruet | ................ | F02M 59/102 |
| | | | | 123/90.44 |
| 2016/0230868 A1 * | 8/2016 | Champalou | ............... | F01L 1/14 |

FOREIGN PATENT DOCUMENTS

| | | | | |
|---|---|---|---|---|
| KR | 20110124159 A | * | 11/2011 | ............... F01L 1/14 |
| WO | WO 2011/064044 A1 | * | 6/2011 | ............. F16H 25/14 |

* cited by examiner

CAM FOLLOWER ROLLER DEVICE

CROSS-REFERENCE TO RELATED APPLICATIONS

This application claims priority to French Patent Application No. 12/03229 filed Nov. 29, 2012, the contents of which is fully incorporated herein by reference.

FIELD OF THE INVENTION

The present invention relates to the field of cam follower roller devices used in automotive or industrial applications. An advantageous application of the invention relates to the use of the cam follower roller device in a fuel injection pump intended for an internal combustion engine, in particular of motor vehicles such as automobiles or trucks.

BACKGROUND OF THE INVENTION

A device of this type comprises a tappet and a roller mounted rotatably on the tappet and provided to cooperate with a cam synchronized with the camshaft of the internal combustion engine in such a way that rotation of the camshaft results in the periodic displacement of a piston of the pump bearing against said tappet to enable distribution of fuel.

The tappet of such devices is usually implemented as a single relatively solid piece produced, for example, by cold forging. The roller of the device is generally mounted rotatably on the tappet via a separate spindle. This spindle is conventionally mounted on the tappet by upsetting or crimping in lateral bores in the walls of a sleeve which partially accommodates the roller.

In order to avoid a phenomenon of major friction between the ends of the spindle protruding from the bores and the inner walls of the guide bore formed in the associated housing which guides an axial movement of the tappet, it is known to fix the spindle in the bores so as to avoid movement in the axial direction. A circlip or plug, for example, may be used for this purpose. This fixing necessitates an additional assembly step and an additional element.

Another solution consists in forming the ends with convex surfaces. This makes the spindle, and consequently the whole device, rather expensive.

Furthermore, the document FR 2946406 proposes providing a support body for the roller fixed in a sleeve of the tappet. The ends of the spindle are fixed, for example by a press fit, in through-holes formed in a peripheral wall of the support body and disposed opposite one another.

This fixing makes the assembly rather complex.

The support body is mounted in the sleeve by a press fit, welding or brazing. Insufficient strength risks allowing undesirable displacement of the support body in the sleeve, and excessive force or heat risks causing deformation of the sleeve while the body is being installed, such as to impede sliding of the sleeve in its bore.

It is the object of the present invention to eliminate these disadvantages. More particularly, the present invention aims to provide a cam follower roller device which is less expensive while at the same time allowing correct sliding of the tappet in the bore guiding an axial movement of the tappet, and which is reliable, economical and easy to produce and assemble.

SUMMARY OF THE INVENTION

In one embodiment, the cam follower roller device, in particular for a fuel injection pump of an internal combustion engine, comprises a tappet comprising a sleeve provided with an opening adapted to partially accommodate a roller, said roller being mounted rotatably in the sleeve and having a portion which protrudes axially from the opening of the sleeve provided to cooperate with a cam, said roller also comprising a spindle and a cylindrical body, the ends of the spindle projecting from the lateral faces of the body.

According to the invention, the device also comprises a roller support body housed in the sleeve, said support body including supports which support the ends of the spindle.

Another advantageous application of the invention relates to the use of the device in a rocker arm system provided to control valves of an internal combustion piston engine.

It is proposed that the support body includes supports open towards the opening of the sleeve and supporting the ends of the spindle.

In this way a cam follower roller device which is reliable, inexpensive and easy to produce and assemble is obtained, which cam follower roller device at the same time enables correct sliding of the tappet in the bore guiding an axial movement of the tappet.

To secure the roller during transportation and installation, it is proposed to provide a means of axial retention for holding the roller in the sleeve. This means of axial retention may be removable and may be implemented by a clip and/or plug of plastics material which may be removed during installation of the device or may be permanent.

In the latter case, the retaining means is preferably constituted by a deformation of the edge of the opening of the sleeve produced after the support body and the roller have been inserted.

In a preferred embodiment, the sleeve includes a base. The support body is preferably seated on this base of the sleeve. This base ensures a well-defined axial position of the support body in the sleeve.

The base of the sleeve is advantageously fixed in the sleeve by a press fit. Thus, a sleeve may be produced from low-cost tubing. It is proposed that the base fixed in the sleeve by a press fit forms a single piece with the support body.

Preferably, the base of the sleeve is fixed in the sleeve by a press fit in combination with external deformation of the sleeve.

Alternatively, it is entirely possible to produce a sleeve with a base by cold forging.

In a preferred embodiment, the support body is produced from a strip of sheet metal cut and bent to form a ring shape. A very low-cost and lightweight support body can be produced simply in this way.

Furthermore, it is proposed that the support body includes a structure or slit interacting with a corresponding structure of the sleeve so as to provide an anti-rotation function. In particular, the slit may be implemented as a gap resulting from the bending of a sheet metal strip as mentioned above.

In another embodiment, the support body is a ring of plastics material with metal supports inserted or moulded into the plastics material.

Another aspect of the invention relates to a method for manufacturing a cam follower roller device in which the support body is inserted into the sleeve prior to insertion of the roller.

In this way, the device can be assembled in a simple manner without installing a spindle or shaft in lateral bores in the walls of a sleeve which partially accommodates the roller.

BRIEF DESCRIPTION OF THE FIGURES

The present invention will be better understood with reference to the detailed description of a non-limiting exemplary embodiment which is illustrated in the appended drawings, in which.

DETAILED DESCRIPTION OF THE INVENTION

Figure 1:
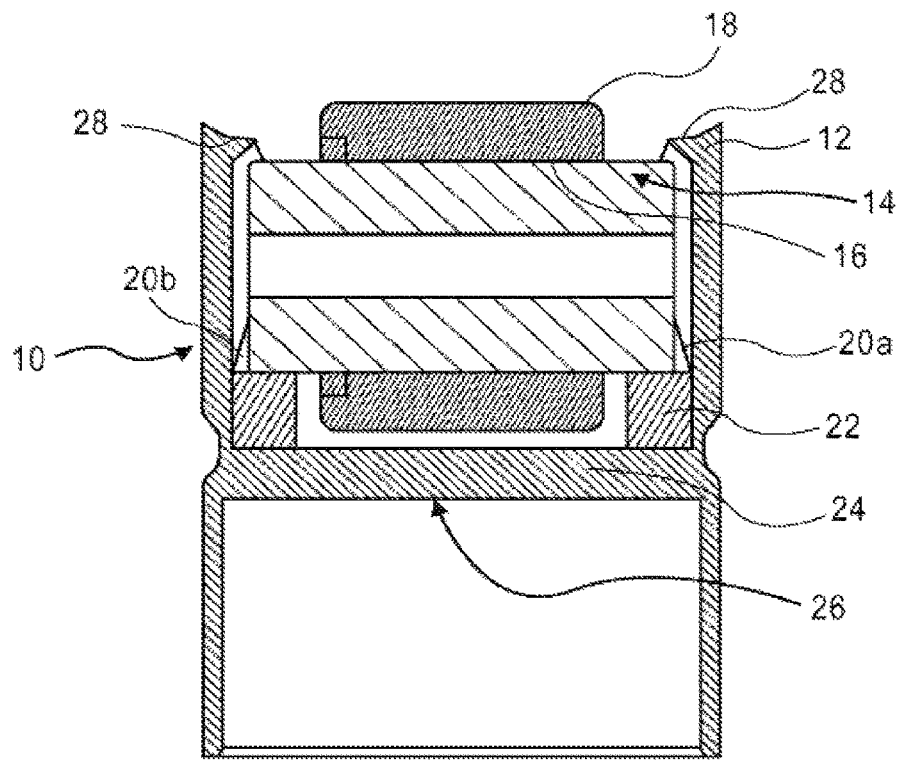
FIG. 1 is an axial sectional view of a cam follower roller device according to a first embodiment of the invention.

FIG. 1 is an axial sectional view of a cam follower roller device according to a first embodiment of the invention. The device comprises a tappet 10 having a sleeve 12 with a circular opening for receiving a main portion of a roller 14. The roller 14 is mounted rotatably in the sleeve 12 and includes a portion which protrudes axially from the opening of the sleeve 12. This portion is provided to cooperate with a cam (not shown). The device may be used in a fuel injection pump intended for an internal combustion engine.

The roller 14 comprises a spindle 16 and a cylindrical body 18. The ends of the spindle 16 project from the lateral faces 19 of the cylindrical body 18 of the roller 14. The cylindrical body 18 may either be mounted rotatably on the spindle 16 via a bearing or needle bearing arrangement, or may be mounted in a fixed manner by upsetting or crimping. Furthermore, it is also possible to produce the spindle 16 and the cylindrical body 18 of the roller in one piece.

A roller 14 support body 22 is seated on a base 24 of the sleeve 12. A force, which may have an amplitude of 1-20 kilonewtons ("kN") in the application of an injection pump acting on a contact surface of the roller 14, is transmitted by the spindle to the bearings of the support body 22 and, via the support body, to the base 24. For this application, a piston of the injection pump bears against the external surface 26 of the base. The force is therefore transmitted primarily to the piston and not to the walls of the sleeve 12.

The device includes a retaining means 28 to hold the roller 14 in the sleeve 12 during transportation or installation. The retaining means 28 is formed by a deformation of the edge of the opening of the sleeve 12 produced after the support body 22 and the roller 14 have been inserted. The deformation takes the form of a shoulder projecting into the interior of the sleeve 12 such that the roller 14 can no longer be removed.

Figure 2:
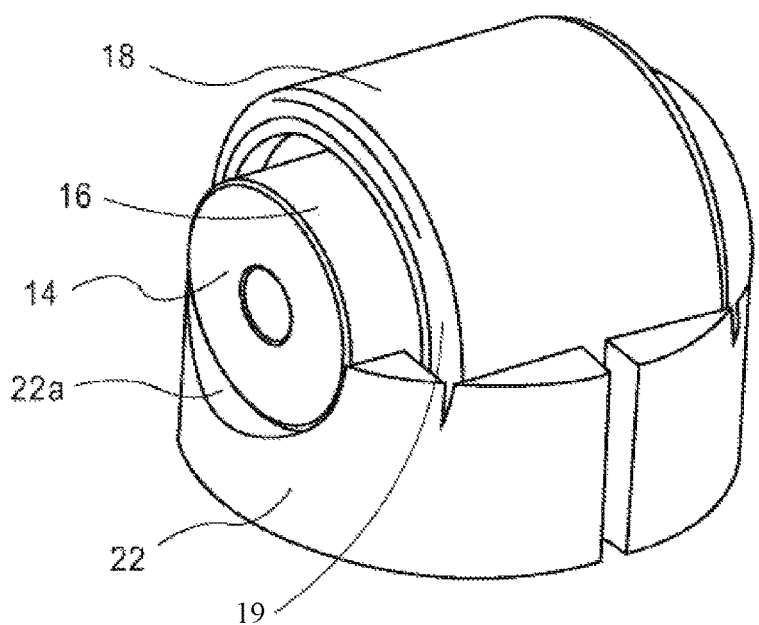
FIG. 2 is a perspective view of a roller and of a support body of the roller of the device of FIG. 1.

FIG. 2 is a perspective view of a roller 14 and of a support body 22 of the roller of the device of FIG. 1. The support body 22 includes open bearings or supports 20a, 20b with an orientation, such as that shown in FIG. 1, towards the opening of the sleeve 12. The supports 20a, 20b have a semicircular profile, open towards the top and having a diameter corresponding to that of the ends of the spindle 16.

The support body 22 includes a slit 30 interacting with a pin (not shown) inserted in a small bore in the wall of the sleeve 12 so as to provide an anti-rotation function.

Figure 3:
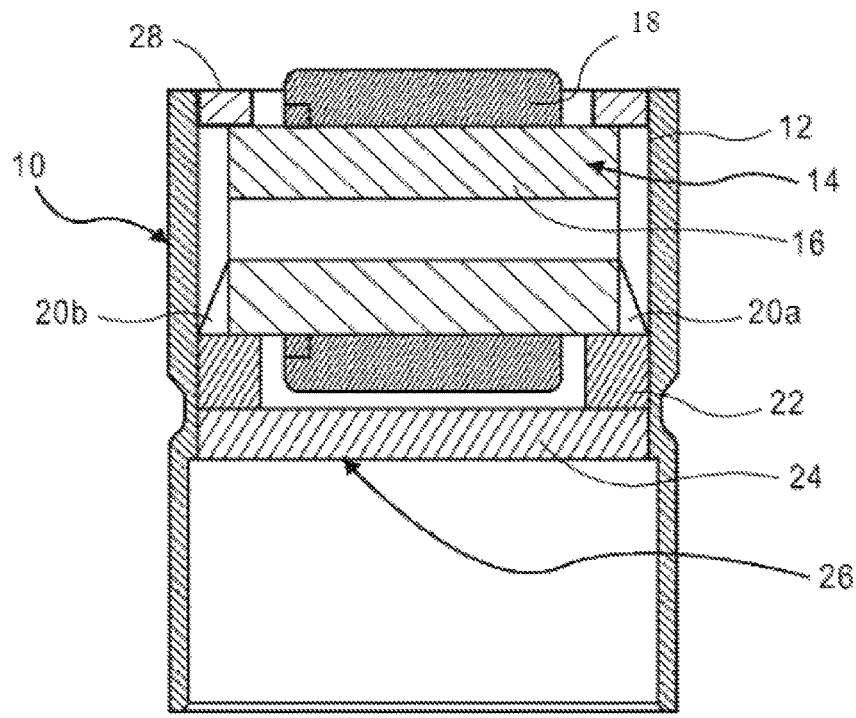
FIG. 3 is an axial sectional view of a cam follower roller device according to a second embodiment of the invention.

FIG. 3 is an axial sectional view of a cam follower roller device according to a second embodiment of the invention in which the base of the sleeve 24 is fixed in the sleeve 12 by a press fit in combination with external deformation of the sleeve 12.

The sleeve 12 may be produced very simply using a portion of a tube and a washer. The washer is placed in the tube and the tube is pressed from the outside in order to be deformed inwards to clinch the washer.

Figure 4:
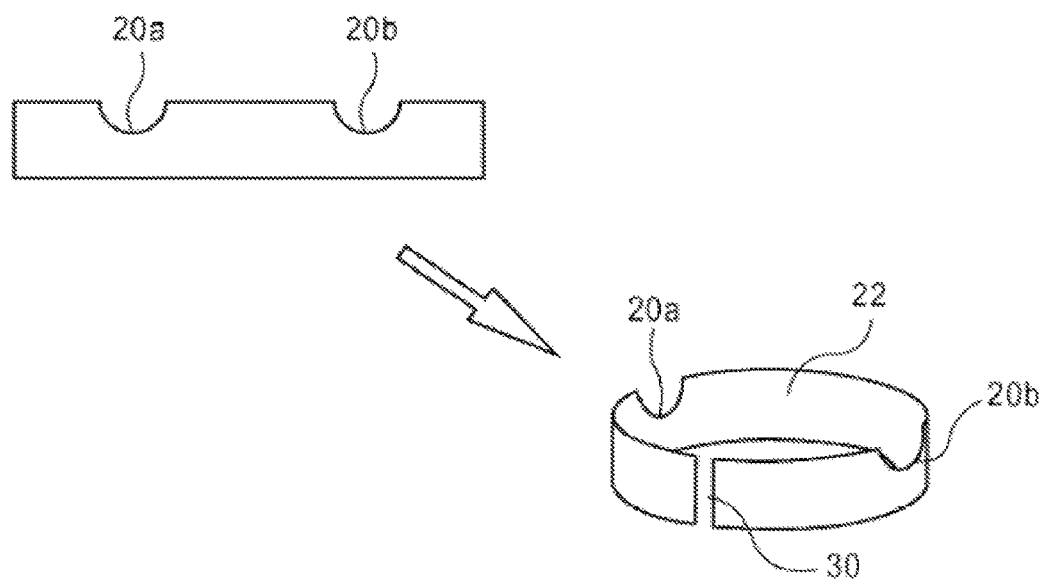
FIG. 4 is an illustration of a method for manufacturing the support body of the device of FIGS. 1-3.

FIG. 4 is an illustration of a method for manufacturing the support body of the device of FIGS. 1-3. The support body 22 is fabricated from a strip of cut sheet metal having semicircular recesses bent to form a ring shape.

Figure 5:
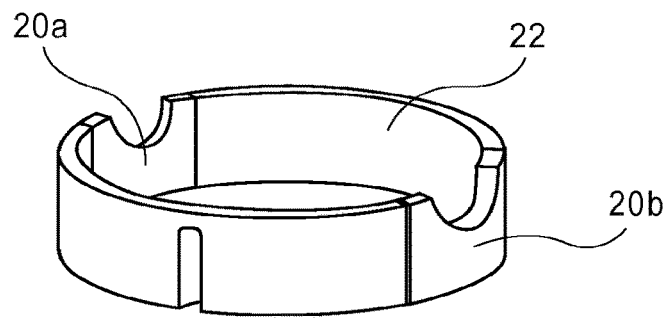
FIG. 5 shows a support body of composite material according to an alternative embodiment.

FIG. 5 shows a support body of composite material according to an alternative embodiment in which the support body 22 is a ring of plastics material with metal supports 20a, 20b inserted or moulded into the plastics material.

FIGS. 6a-6d are illustrations of a method for producing a cam follower roller device according to the invention.

Figure 6A:
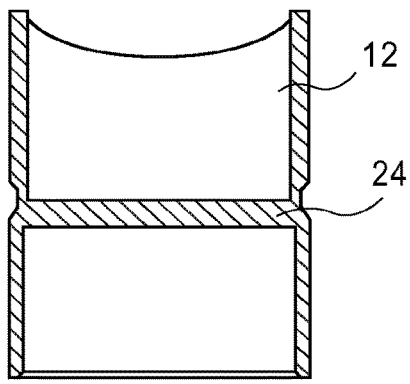
FIGS. 6a-6d are illustrations of a method for producing a cam follower roller device according to the invention.

In a first step illustrated in FIG. 6a, showing the opening of the sleeve 12 with the base 24, the opening is oriented upwardly.

Figure 6B:
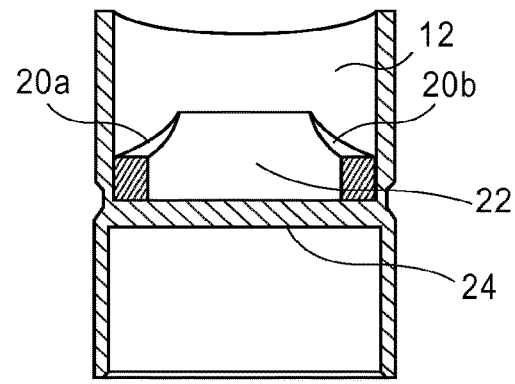

In a second step illustrated in FIG. 6b, the support body 22 is inserted in the sleeve 12 and is seated on the base 24 in such a way that the supports 20a, 20b are open towards the top.

Figure 6C:
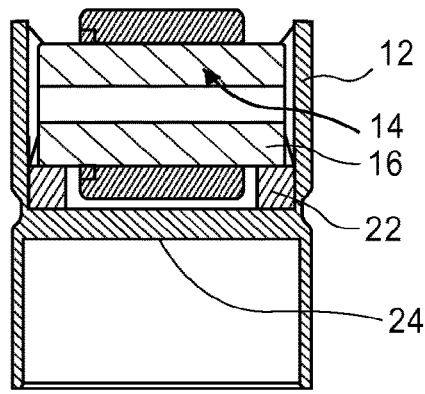

In a third step illustrated in FIG. 6c, the roller 14 with its spindle 16 is inserted in the sleeve 12. The ends of the spindle are automatically inserted in the supports 20a, 20b.

Figure 6D:
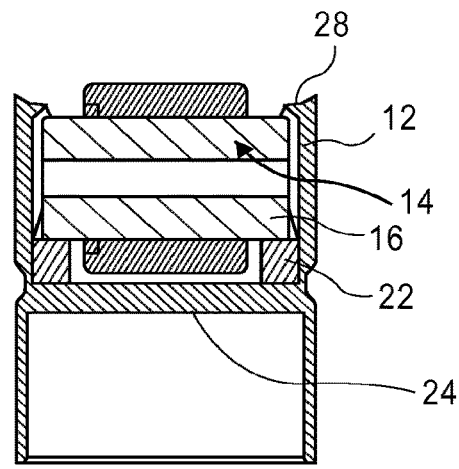

Finally, in a fourth step illustrated in FIG. 6d, the retaining means 28 is produced by deformation of the edge of the opening of the sleeve 12 with an upsetting tool or other suitable tool.

Figure 7A:
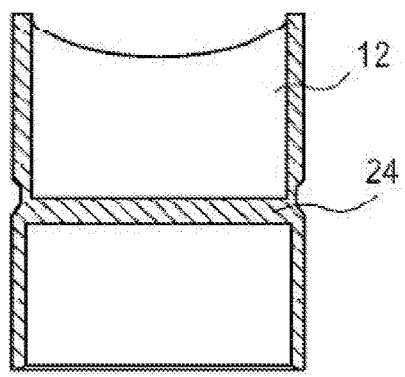
FIGS. 7a-7d are illustrations of an alternative method for producing a cam follower roller device according to the invention.
Figure 7B:
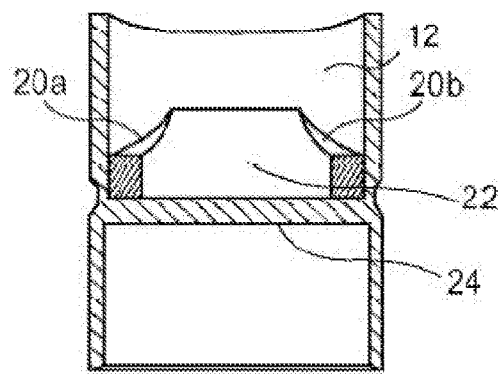
Figure 7C:
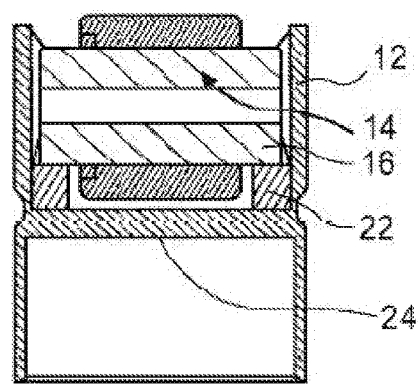
Figure 7D:
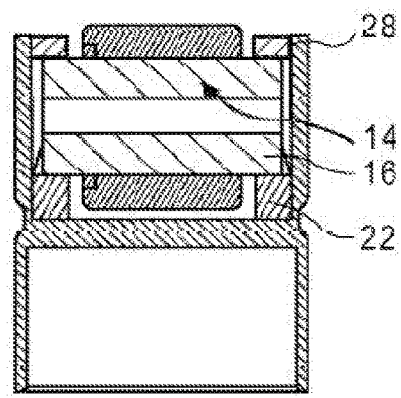

FIGS. 7a-7d are illustrations of an alternative method for producing a cam follower roller device according to the invention. The steps of FIGS. 7a-7c are identical to those of FIGS. 6a-6c. In a fourth step illustrated in FIG. 7d, the retaining means 28, implemented as a plastics element, is inserted in the opening of the sleeve 12. The retaining means 28 may be removed before the roller is placed in contact with the cam.

The invention claimed is:

1. A cam follower roller device comprising:
a tappet having a sleeve including an opening adapted to partially accommodate a roller, wherein the roller is rotatably mounted to the sleeve and has a portion which protrudes axially from the opening of the sleeve, and the roller includes a spindle and a cylindrical body, the cylindrical body being mounted on the spindle such that the cylindrical body configured to rotate with respect to the spindle, ends of the spindle projecting from lateral faces of the cylindrical body;
a support body for the roller that is housed in the sleeve, the support body including supports which contact and support the ends of the spindle, the support body being seated against a base of the sleeve and positioned between the ends of the spindle and the base, the roller being spaced apart from the base by the support body, and the support body being spaced from the cylindrical body such that no portion of the support body contacts the cylindrical body; and
a deformation of an axial end of the opening of the sleeve produced after the support body and the roller have been inserted such that the deformation is configured to retain the roller in the sleeve during transportation, wherein the support body is cylindrical and is positioned coaxially with the sleeve.

2. The cam follower roller device according to claim 1, wherein the supports have semi-circular profiles that open towards the opening of the sleeve.

3. The cam follower roller device according to claim 1, wherein the base of the sleeve is fixed in the sleeve by a press fit.

4. The cam follower roller device according to claim 3, wherein the base of the sleeve is fixed in the sleeve by a press fit in combination with external deformation of the sleeve.

5. The cam follower roller device according to claim 4, wherein the support body is produced from a strip of sheet metal cut and bent to form a ring shape.

6. The cam follower roller device according to claim 1, wherein the support body is ring-shaped and wherein an outer diameter surface of the support body faces an inner diameter surface of the sleeve.

7. The cam follower roller device according to claim 6, wherein the outer diameter surface of the support body engages the inner diameter surface of the sleeve.

8. A cam follower roller device comprising:
a tappet having a sleeve including an opening adapted to partially accommodate a roller, wherein the roller is rotatably mounted to the sleeve and has a portion which protrudes axially from the opening of the sleeve, and the roller includes a spindle and a cylindrical body, ends of the spindle projecting from lateral faces of the cylindrical body;
a support body for the roller that is housed in the sleeve, the support body including supports which support the ends of the spindle; and
retaining means for holding the roller in the sleeve during transportation, wherein the retaining means is implemented by a deformation of an axial end of the opening of the sleeve produced after the support body and the roller have been inserted,
wherein the support body is seated on a base of the sleeve,
wherein the base of the sleeve is fixed in the sleeve by a press fit, and
wherein the support body comprises a first plastic section having first and second circumferential ends, a second plastic section having third and fourth circumferential ends, a first metal support extending circumferentially between the first circumferential end of the first plastic section and the third circumferential end of the second plastic section, and a second metal support extending circumferentially between the second circumferential end of the first plastic section and the fourth circumferential end of the second plastic section,
the support body forms a ring when the first metal support is attached to the first circumferential end of the first plastic section and the third circumferential end of the second plastic section, and, the second metal support is attached to the second circumferential end of the first plastic section and the fourth circumferential end of the second plastic section.

9. A cam follower roller device comprising:
a tappet having a sleeve including an opening adapted to partially accommodate a roller, wherein the roller is rotatably mounted to the sleeve and has a portion which protrudes axially from the opening of the sleeve, and the roller includes a spindle and a cylindrical body, ends of the spindle projecting from lateral faces of the cylindrical body;
a support body for the roller that is housed in the sleeve, the support body including supports which support the ends of the spindle, the support body being seated against a base of the sleeve and positioned between the ends of the spindle and the base, the roller being spaced apart from the base by the support body, and the support body being spaced from the cylindrical body such that no portion of the support body contacts the cylindrical body;
retaining means for holding the roller in the sleeve during transportation, wherein the retaining means is implemented by a deformation of an axial end of the opening of the sleeve produced after the support body and the roller have been inserted;
wherein the support body is positioned coaxially with the sleeve, the support body being ring-shaped such that the support body comprises an axial through-hole, a portion of the cylindrical body being located within the axial through-hole of the support body such that a minimum radius of the support body is greater than a maximum radius of the cylindrical body.

* * * * *